United States Patent [19]

Heinbockel et al.

[11] 4,431,482
[45] Feb. 14, 1984

[54] DISPERSION APPARATUS FOR THE PREPARATION OF WASTE PAPER

[75] Inventors: Wolfgang Heinbockel, Weingarten; Harald Selder, Schlier; Erich Linck, Horgenzell, all of Fed. Rep. of Germany

[73] Assignee: Escher Wyss GmbH, Ravensburg, Fed. Rep. of Germany

[21] Appl. No.: 317,144

[22] Filed: Nov. 2, 1981

[30] Foreign Application Priority Data

Nov. 25, 1980 [CH] Switzerland .................. 8699/80

[51] Int. Cl.³ .................. D21B 1/32; D21B 1/34; D21C 5/02
[52] U.S. Cl. .................. 162/243; 162/4; 162/246; 162/261; 241/261; 366/304
[58] Field of Search .................. 162/20, 23, 261, 28, 162/4, 57, 52, 243, 246; 241/28, 261, 261.2, 261.3, 298; 366/196, 303, 304

[56] References Cited

U.S. PATENT DOCUMENTS

| | | | |
|---|---|---|---|
| 2,226,429 | 12/1940 | Hall | 241/261 |
| 2,507,507 | 5/1950 | Egedal | 241/261.2 |
| 3,076,610 | 2/1963 | Rosenfeld et al. | 241/28 |
| 3,808,090 | 4/1974 | Logan et al. | 162/23 |

FOREIGN PATENT DOCUMENTS

| | | | |
|---|---|---|---|
| 2346642 | 4/1974 | Fed. Rep. of Germany | 162/23 |
| 2951311 | 7/1981 | Fed. Rep. of Germany | 366/304 |
| 872502 | 7/1961 | United Kingdom | 366/304 |

*Primary Examiner*—Steve Alvo
*Attorney, Agent, or Firm*—Werner W. Kleeman

[57] ABSTRACT

A dispersion apparatus for the preparation of waste paper comprises fittings arranged within a housing and composed of a rotor containing ring-shaped concentric rows of teeth and a stator containing ring-shaped concentric rows of teeth. For the removal of the dispersed substance or material an additional rotor ring containing a number of transport teeth is mounted upon the rotor and an additional stator ring is mounted upon the stator. The stator ring possesses an opening above the discharge chute or portion of the apparatus which extends through an angle of about 90°. The apparatus composed of the rotor ring and the transport teeth and the stator ring containing the opening renders possible removal of the dispersed substance or material, without altering its consistency and without there occurring cooling of the processed substance or material.

10 Claims, 2 Drawing Figures

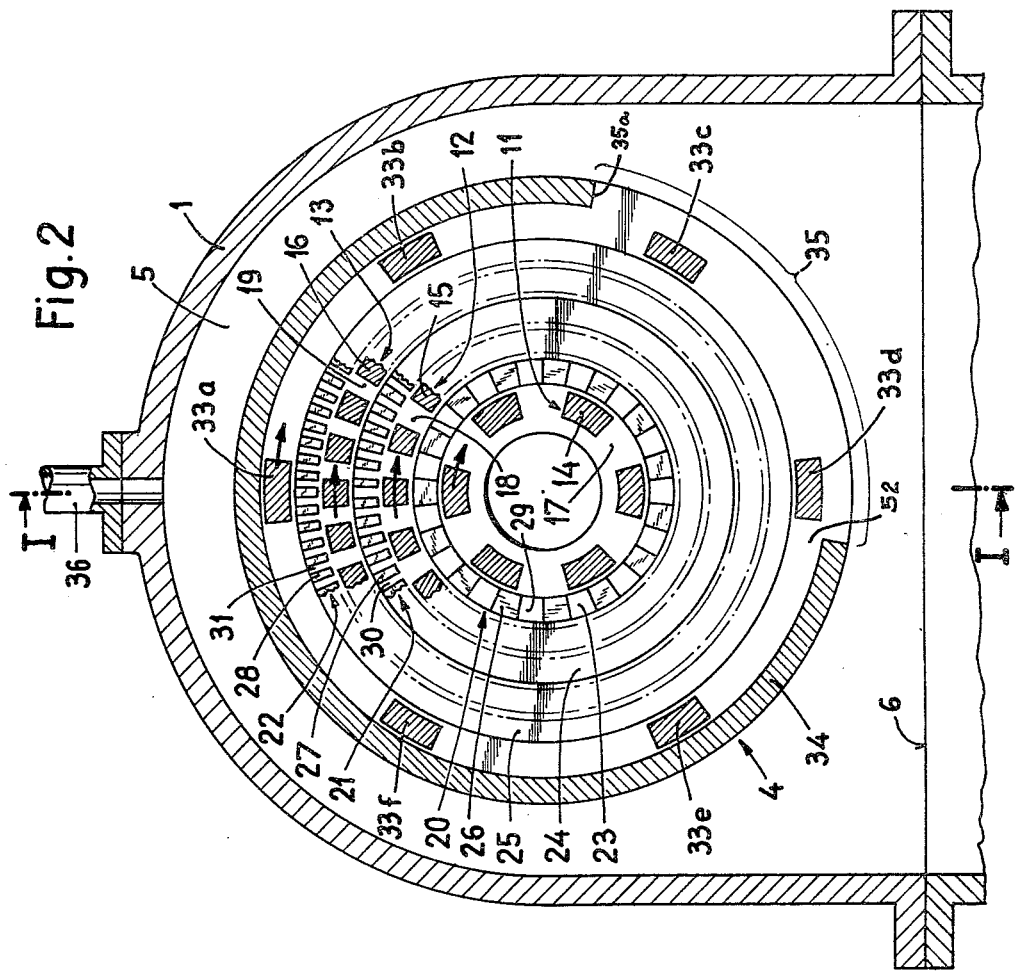
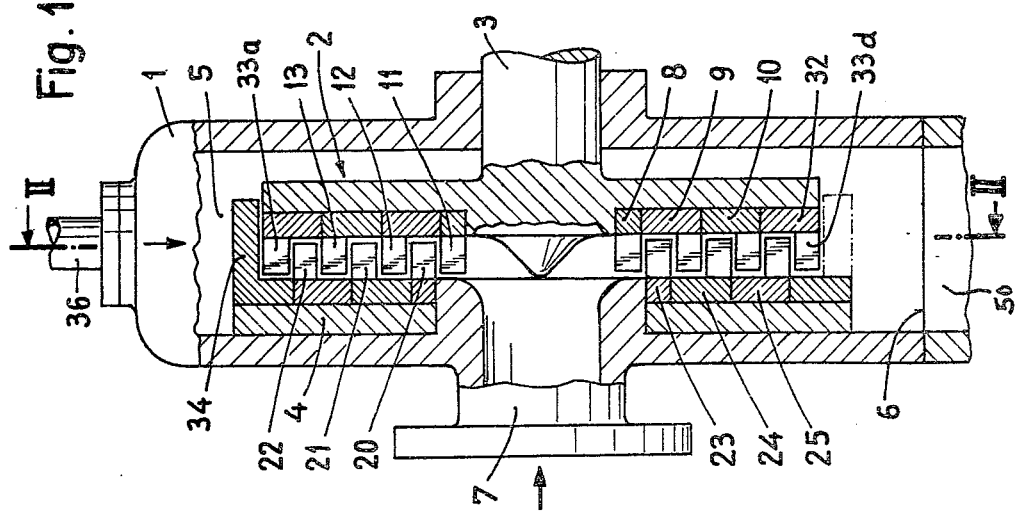

DISPERSION APPARATUS FOR THE PREPARATION OF WASTE PAPER

CROSS REFERENCE TO RELATED CASE

This application is related to the commonly assigned, copending United States application Ser. No. 06/317,146, filed Nov. 2, 1981, entitled "Method for Increasing The Specific Volume During The Preparation Of Waste Paper Materials", and listing as the inventor Erich Linck.

BACKGROUND OF THE INVENTION

The present invention relates to a new and improved construction dispersion apparatus for the preparation of waste paper materials or simply referred to herein as waste paper.

Generally speaking, the dispersion apparatus of the present invention is of the type comprising a housing in which there is arranged a rotor which contains teeth arranged in substantially ring-shaped rows disposed concentrically with respect to the axis of rotation of the rotor. Between these teeth there are located tooth gaps. Stationary ring-shaped rows of teeth of a stator engage into the ring-shaped intermediate spaces between the rotatable rows of teeth of the rotor. The stationary ring-shaped rows of teeth of the stator likewise possess tooth gaps. The flow of the processed material or substance is accomplished through the tooth gaps of the rotatable and the stationary rows of teeth.

As is known in the papermaking art such type of dispersion equipment serves to disintegrate the heated waste paper which has been defiberized in upstream arranged devices and concentrated or thickened, for instance, to a 25% to 30% stock density and heated to about 95° C. in a heating worm; and the thus obtained spurious or disturbing substances are comminuted.

With dispersing apparatus of the type upon which the invention is based it was previously conventional practice to flush the dispersed substance or material out of the equipment by spraying water through nozzles into the housing.

This flushing of the housing with water is associated with the following appreciable drawbacks:

On the one hand, there occurs a dilution of the substance or stock, i.e. its consistency, to a degree which is undesired in many instances. For instance, this is unfavorable if a bleaching operation is to subsequently occur, or, if there is required an intermediate storage or stacking of the material.

Furthermore, it can happen that there arises a pronounced bitumenous contamination of the fittings. Under the expression "fittings" or "hardware" as used in the context of this disclosure there is understood in this technology the rotor composed of different concentric rings and provided with teeth and the stator composed of different concentric rings and provided with teeth.

The pronounced bituminous contamination predominantly arises at the outer stator ring. The basis for such bituminous contamination is predictable owing to the cooling of the fittings, especially the outermost fitting ring by the housing flushing water. Part of the bitumen condensates and contaminates or soils the fittings and, on the other hand, can coagulate and form larger lumps or pieces which then can be flushed out of the equipment along with the dispersed substance or material.

A further appreciable drawback of the state-of-the-art equipment resides in the fact that for the removal of the substance or material there is needed additional equipment (i.e. water lines or conduits, regulation devices and nozzles).

Finally, it is further to be here mentioned that an additional danger prevails inasmuch as the nozzles tend to clog during the operation, particularly if, as is typically the case, there is used as the flushing water that water available at the plant which sometimes does not possess the requisite degree of purity. Even with only partial clogging of the nozzles there arises at least a reduced infeed of water which, upon clogging of the housing, can result in combustion of the dispersed substance or material due to the development of heat of friction.

SUMMARY OF THE INVENTION

Therefore, with the foregoing in mind it is a primary object of the present invention to provide a new and improved construction of dispersion apparatus for the preparation of waste paper which is not associated with the aforementioned drawbacks and limitations of the prior art constructions.

Another and more specific object of the present invention aims at providing a new and improved construction of dispersion apparatus which ensures for a faultless removal of the dispersed stock, i.e. the substance or material which is being processed, which is less complicated in its construction and design than heretofore known dispersion equipment and does not require any appreciable maintenance or servicing, and, in particular, does not alter the consistency of the processed stock during the dispersion operation and does not cause any undesired cooling of such stock.

Yet a further significant object of the present invention aims at the provision of a new and improved construction of dispersion apparatus for the preparation of waste paper which is relatively simple in construction and design, extremely reliable in operation, economical to manufacture, not readily subject to breakdown or malfunction, and requires a minimum of maintenance and servicing.

Now in order to implement these and still further objects of the invention, which will become more readily apparent as the description proceeds, the dispersion apparatus of the present development is manifested by the features that for the removal of the dispersed material there is mounted at the rotor an additional outer rotor ring having a number of transport teeth and at the stator an additional outer stator ring which possesses at least one opening arranged over the discharge chute or outlet of the equipment.

According to an advantageous construction of the invention the stator ring of the discharge or removal device contains a single downwardly directed opening extending through an angle of about 90°. In this way there is realized with certainty that the dispersed material will be propelled outwardly and will not be collected in the annular or ring-shaped space between the stator ring and the rotor ring of the discharge or removal device.

The volume of the rotor ring space between the transport teeth of course must be selected to be at least so large that the volume of dispersed material which arrives per unit of time can be readily handled, in order to thereby preclude any danger of clogging of the equipment. It has been found that advantageously the free volume of this ring-shaped space or chamber amounts to about fourfold to fivefold the volume of the material which is to be received.

The number of transport teeth which are to be attached to the rotor ring of the removal device, for instance by welding or threaded bolts or other equivalent fastening expedients, or also can form a structural unit, is chosen to be appreciably less than the number of teeth of the outermost stator ring of the fittings, since these teeth are exclusively responsible for the transport of the substance, in other words function more or less as "removal or discharge means".

Although the invention also encompasses a uniform distribution of the transport teeth over the circumference of the rotor ring, it is nonetheless advantageous to provide an irregular or non-uniform arrangement of the transport teeth. With this design there can be avoided the noises caused by the machine which contain a tone found to be unpleasant by people or operators near the machine.

As to the configuration of the transport teeth there are available different designs or constructions. Thus, for instance, such can have bevelled or tapered side walls, particularly for the purpose of reducing noise, in other words can be configured in a cone-like manner. However, it also can be advantageous to provide the transport teeth, for instance, with a rounded profile or contour or with vertical side walls or faces.

Finally, an advantageous further construction of the invention resides in the features that within the housing of the dispersion or dispersing apparatus there is arranged at least one location for the infeed of superheated stem. This in turn causes an additional heating of the substance or material which is to be dispersed, and thus, an additional softening of the bitumen contained within the material.

On the other hand, such additional heating advantageously can be employed during the start-up operation of the machine for pre-heating the fittings.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is an axial sectional view of an exemplary embodiment of a dispersion apparatus or dispergator taken along the line I—I of FIG. 2; and FIG. 2 is a cross-sectional view of the dispersion apparatus shown in FIG. 1, taken substantially along the line II—II thereof.

DETAILED DESCRIPTION OF THE PREFERRED EMBODIMENTS

Describing now the drawings, in FIGS. 1 and 2 there is shown an exemplary embodiment of dispersion apparatus which, in conventional manner, contains a housing 1 within which there is rotatably mounted in any suitable fashion a rotor 2. The rotor 2 possesses a drive shaft 3 which is sealed in any appropriate manner in relation to the housing 1. Additionally, there is also secured within the housing 1 in conventional fashion a stator 4 which together with the rotor 2 forms the fittings or hardware.

As particularly well seen by reverting to FIG. 1, the fittings within the housing 1 are surrounded by a free space or chamber 5 which possesses at one side an opening 6 which, for instance, flow communicates with a removal or discharge chute, generally designated by reference character 50, and constituting the outlet or discharge portion of the equipment. The housing 1 additionally contains an axial inlet 7 for the waste paper which is to be dispersed.

Three rotor rings 8, 9 and 10 are attached in known manner with the aid of any suitable and therefore not particularly illustrated attachment or fixation means at the rotor 2. These rotor rings 8, 9 and 10 possess rows of teeth 11, 12 and 13 which are essentially coaxially dispositioned wih respect to the rotor drive shaft 3.

As particularly well seen by inspecting FIG. 2 the rows of teeth 11, 12 and 13 each contain teeth 14, 15 and 16 between which there are located the tooth gaps or spaces 17, 18 and 19. In the intermediate spaces between the rows of teeth 11, 12 and 13 there engage rows of teeth 20, 21 and 22 of stator rings 23, 24 and 25, respectively, which are attached to the stator 4. These rows of teeth or tooth rows 20, 21 and 22 possess teeth 26, 27 and 28 containing tooth gaps or spaces 29, 30 and 31, respectively.

According to the invention for the removal or withdrawal of the dispersed material an additional outer rotor ring 32 is mounted upon the rotor 2. Extending over the circumference of this additional outer rotor ring 32 are transport teeth 33a to 33f which, in the embodiment under discussion, are attached at a substantially uniform spacing or distance from one another. As already also previously explained these transport teeth 33a to 33f also can be advantageously arranged at a non-uniform or different spacing from one another.

Additionally, there is mounted at the stator 4 an additional outer stator ring 34 having a sector-like opening 35 extending through or subtending an angle of about 90°. It will be understood that this outer stator ring 34 comprises a solid ring having a circumferential portion extending in the direction of the axis of rotation towards said outer rotor ring 32 and through a distance greater than the length of the teeth of the ring-shaped rows of teeth of the stator. The upper edge 35a of the opening 35 which is directed downwardly towards the discharge or removal chute or outlet portion 50 of the equipment is inclined with respect to the horizontal i.e. a horizontal plane extending through the lengthwise axis or axis of rotation of the rotor through an angle of about 10°, so that there is positively ensured for a downward exit or removal of the processed material, whereas by means of the aforementioned subtending angle or aperture angle of about 90° of the opening 35 there is precluded any entrainment of the processed material back into the ring-shaped space or chamber 52 of the removal device. The discharge opening 35 of the outer stator ring 34 defines a relatively large size opening through which the material removed by the plurality of transport teeth of the outer rotor ring 32 can outflow without the need for using flushing water.

At the upper portion of the housing 1 there is arranged an inlet 36 for the additional infeed of a suitable heating medium, typically superheated steam.

As will be further evident from the drawings, the outer stator ring comprises a solid ring having a circumferential portion extending in the direction of the axis of rotation towards said outer rotor ring and through a distance greater than the length of the teeth of said ring-shaped rows of teeth of said stator.

Finally, as previously explained the regularly or irregularly distributed rotor transport teeth 33a to 33f can have various configurations. For instance, they may be substantially conical, or else rectangular in section, or have a rounded contour or shape.

While there are shown and described present preferred embodiments of the invention, it is to be distinctly understood that the invention is not limited thereto, but may be otherwise variously embodied and practiced within the scope of the following claims.

What we claim is:

1. A dispersion apparatus for the preparation of waste paper material, comprising:
 a housing;
 a rotor rotatably arranged in said housing for rotation about a predetermined axis of rotation;
 said rotor being provided with teeth arranged in substantially ring-shaped rows disposed essentially concentrically with respect to said axis of rotation to define therebetween substantially ring-shaped intermediate spaces;
 said teeth containing tooth gaps therebetween;
 a stator;
 stationary substantially ring-shaped rows of teeth provided for said stator;
 said stationary ring-shaped rows of teeth of said stator engaging into said ring-shaped intermediate spaces between the rotatable rows of teeth of said rotor;
 said rows of teeth of said stator possessing tooth gaps;
 said tooth gaps of said rotor and said tooth gaps of said stator being spaced to allow the waste paper material to flow through said tooth gaps of the rotatable rows of teeth and the stationary rows of teeth in order to process the material flowing therethrough;
 means defining a discharge portion for the processed dispersed, hig consistency material;
 said rotor including an outer rotor ring having a plurality of transport teeth and serving for the removal of the dispersed material;
 said stator including an outer stator ring cooperating with said outer rotor ring serving for the removal of the dispersed material; and
 said outer stator ring comprising a solid ring possessing a relatively large discharge opening for the dispersed material which is arranged over the discharge portion of the apparatus.

2. The dispersion apparatus as defined in claim 1, wherein:
 said transport teeth of the outer rotor ring are substantially uniformly distributed over the circumference of said outer rotor ring.

3. The dispersion apparatus as defined in claim 1, wherein:
 said transport teeth of the outer rotor ring are non-uniformly distributed over the circumference of said outer rotor ring.

4. The dispersion apparatus as defined in claim 1, wherein:
 said discharge opening of said outer stator ring is downwardly directed towards said discharge portion and has an angle subtending an arc of approximately 90°.

5. The dispersion apparatus as defined in claim 4, wherein:
 said opening has an upper edge which encloses with respect to a horizontal plane passing through the axis of rotation, beneath said horizontal plane, and angle of approximately 10° and overlies the discharge portion of the apparatus.

6. The dispersion apparatus as defined in claim 1, wherein:
 said outer stator ring has a free substantially ring-shaped space surrounding the outer rotor ring which possesses a volume which is greater than the volume of the dispersed material which is to be received.

7. The dispersion apparatus as defined in claim 1, further including:
 at least one inlet means for superheated steam connected with said housing.

8. The dispersion apparatus as defined in claim 1, wherein:
 said plurality of transport teeth of said outer rotor ring being fewer in number than the teeth of said rotor arranged in said ring-shaped rows and being spaced at a greater distance from one another than said teeth of said rotor arranged in said ring-shaped rows.

9. The dispersion apparatus as defined in claim 1, wherein:
 said discharge opening of said outer stator ring defines a relatively large size opening through which the material removed by said plurality of transport teeth of the outer rotor ring can outflow without the need for using flushing water.

10. A dispersion apparatus for the preparation of waste paper material, comprising:
 a housing;
 a rotor rotatably arranged in said housing for rotation about a predetermined axis of rotation;
 said rotor being provided with teeth arranged in substantially ring-shaped rows disposed essentially concentrically with respect to said axis of rotation to define therebetween substantially ring-shaped intermediate spaces;
 said teeth containing tooth gaps therebetween;
 a stator;
 stationary substantially ring-shaped rows of teeth provided for said stator;
 said stationary ring-shaped rows of teeth of said stator engaging into said ring-shaped intermediate spaces between the rotatable rows of teeth of said rotor;
 said rows of teeth of said stator possessing tooth gaps;
 said tooth gaps of said rotor and said tooth gaps of said stator being spaced to allow the waste paper material to flow through said tooth gaps of the rotatable rows of teeth and the stationary rows of teeth in order to process the material flowing therethrough;
 means defining a discharge portion for the processed material;
 said rotor including an outer rotor ring having a plurality of transport teeth and serving for the removal of the dispersed material;
 said stator including an outer stator ring cooperating with said outer rotor ring serving for the removal of the dispersed material;
 said outer stator ring possessing a discharge opening for the dispersed material which is arranged over the discharge portion of the apparatus;
 said opening of said outer stator ring being downwardly directed towards said discharge portion and has an angle subtending an arc of approximately 90°;

said opening having an upper edge which encloses with respect to a horizontal plane passing through the axis of rotation, beneath said horizontal plane, an angle of approximately 10° and overlies the discharge portion of the apparatus; and said outer stator ring comprising a solid ring having a circumferential portion extending in the direction of the axis of rotation towards said outer rotor ring and through a distance greater than the length of the teeth of said ring-shaped rows of teeth of said stator.

* * * * *